United States Patent
Tison et al.

(10) Patent No.: US 7,243,035 B2
(45) Date of Patent: Jul. 10, 2007

(54) SYSTEM AND METHOD FOR MASS FLOW DETECTION DEVICE CALIBRATION

(75) Inventors: Stuart A. Tison, McKinney, TX (US); Shiliang Lu, Plano, TX (US)

(73) Assignee: Celerity, Inc., Austin, TX (US)

( * ) Notice: Subject to any disclaimer, the term of this patent is extended or adjusted under 35 U.S.C. 154(b) by 121 days.

(21) Appl. No.: 10/444,249

(22) Filed: May 23, 2003

(65) Prior Publication Data
US 2004/0030522 A1 Feb. 12, 2004

Related U.S. Application Data

(60) Provisional application No. 60/383,024, filed on May 24, 2002.

(51) Int. Cl.
*G01F 1/12* (2006.01)
(52) U.S. Cl. .................................................... 702/100
(58) Field of Classification Search ................ 702/100, 702/104, 84
See application file for complete search history.

(56) References Cited

U.S. PATENT DOCUMENTS

| | | | | |
|---|---|---|---|---|
| 3,876,307 A | | 4/1975 | Skala | |
| 3,945,253 A | * | 3/1976 | Liu et al. ................. | 73/861.02 |
| 4,965,756 A | * | 10/1990 | Pearman et al. ............ | 702/100 |
| 5,012,667 A | * | 5/1991 | Kruse ........................ | 73/1.34 |
| 5,237,523 A | * | 8/1993 | Bonne et al. ............... | 702/100 |
| 5,305,638 A | * | 4/1994 | Saghatchi et al. ............ | 73/202 |
| 5,792,966 A | * | 8/1998 | Weitz et al. ............. | 73/861.61 |
| 5,870,695 A | * | 2/1999 | Brown et al. ............... | 702/138 |
| 5,911,238 A | * | 6/1999 | Bump et al. .............. | 137/487.5 |
| 5,944,048 A | * | 8/1999 | Bump et al. .............. | 137/487.5 |
| 6,230,694 B1 | * | 5/2001 | Cook et al. ............. | 123/568.11 |
| 6,332,348 B1 | * | 12/2001 | Yelverton et al. ............ | 73/1.34 |
| 6,343,617 B1 | * | 2/2002 | Tinsley et al. .............. | 137/486 |
| 6,450,024 B1 | * | 9/2002 | McCulloch et al. ...... | 73/204.25 |
| 6,564,824 B2 | * | 5/2003 | Lowery et al. .......... | 137/487.5 |
| 6,672,154 B1 | * | 1/2004 | Yamagishi et al. ....... | 73/204.22 |
| 6,681,787 B2 | * | 1/2004 | Tinsley et al. ................ | 137/10 |
| 2002/0198668 A1 | * | 12/2002 | Lull et al. ...................... | 702/45 |
| 2003/0136175 A1 | * | 7/2003 | Saikalis et al. .............. | 73/23.2 |
| 2003/0234046 A1 | * | 12/2003 | Shajii et al. ............. | 137/487.5 |

OTHER PUBLICATIONS

International Search Report for PCT/US03/16440 mailed Nov. 5, 2003.

* cited by examiner

*Primary Examiner*—John Barlow
*Assistant Examiner*—Demetrius Pretlow
(74) *Attorney, Agent, or Firm*—Lowrie, Lando & Anastasi, LLP

(57) ABSTRACT

Systems and methods for correcting measurements of fluid flow using device-specific information to compensate for differences between individual devices of the same design. In one embodiment, a method includes providing device-specific calibration data; sensing a fluid flow; computing a measured fluid flow based on the sensed fluid flow, and correcting the measured fluid flow based on the device-specific calibration data. More particularly, the fluid flow measurement is corrected using correction factors that compensate for the use of a gas that is different from the calibration gas ($CF_0(1+aF+bF^2+cF^3)$), for device variations in sensor sensitivity ($1+\alpha\Delta R$), and for variations in the split flow of fluid through the flow meter ($1-\beta\Delta ADC(Sp/100)^2$). The sensor and split flow correction factors may be used independently of each other in some embodiments.

10 Claims, 7 Drawing Sheets

SYSTEM AND METHOD FOR MASS FLOW DETECTION DEVICE CALIBRATION

RELATED APPLICATIONS

This application claims priority to U.S. Provisional Patent Application No. 60/383,024. entitled "Systems And Method For Mass Flow Detection Device Calibration", by Stuart Tison, et al., filed May 24, 2002, which is incorporated by reference as if set forth in its entirety herein.

BACKGROUND OF THE INVENTION

1. Technical Field

The invention relates generally to measurement devices and more particularly to systems and methods for improving the accuracy of mass flow measurement and resulting control of fluids by correcting for physical differences between similar measurement devices.

2. Related Art

Thermal mass flow controllers ("MFCs") measure the flow of a gas by sensing a temperature difference upstream and downstream of a heated section of capillary tubing through which the gas flows. The temperature difference between the upstream and downstream sensors is directly proportional (to the first order) to the gas' specific heat, or heat capacity, and the gas flow.

Thermal MFCs are typically calibrated with one gas and used with another, different gas. A different calibration gas is used because there are approximately 200 pure gasses and 300 mixtures that are used in the semiconductor industry. It would be impractical to calibrate an MFC with all of these gasses for a number of reasons. For one thing, the sheer number of gasses is very large. This problem is compounded by the fact that a manufacturer may have several different types of MFCs, each of which would have to be calibrated with each of the gasses. Another problem is that some of the gasses are corrosive, so it is preferable not to use them to calibrate the MFC. The MFC is therefore typically calibrated with a gas (preferably inert) which mimics the process gas. For example, calibration for a heavy process gas such as HCl3 may be performed with a heavy calibration gas such as SF6.

It should also be noted that the characteristics of the gasses may be different, so the same temperature difference between the upstream and downstream sensors may correspond to different flow rates of the gasses. The flow difference between the different gases is estimated using a gas correction factor. The gas correction factor is typically calculated by neglecting the effects of fluid dynamics, and relying upon the basic linearity of the device. Thus, the gas correction factor is normally just the ratio of the heat capacities of the process gas and calibration gas. In the prior art, a single gas correction factor (a single, constant value) is universally used for all models of MFCs and all flow ranges for a particular process gas. One manufacturer has used the same gas correction factors for over twenty years with a specified accuracy +/−5%.

Over the years, the accuracy of particular gas correction factors has occasionally been challenged. This has precipitated re-determination of the appropriate values for these particular correction factors. Even though the accuracy of the gas correction factors may be periodically re-confirmed, the overall accuracy of the measurement devices is still limited by the assumption of linearity.

Because the semiconductor industry is maturing and process control demands are increasing, more emphasis is being placed on the accuracy of process control instrumentation, including mass flow controllers. While the simple model for estimation of gas correction factors based on the heat capacity of the gas works well for the majority of semiconductor gases, a few gases which have been tested have non-linearities (relative to nitrogen) in excess of 5%. It is preferred to limit the nonlinearities to less than 5%.

For example, one tool may use a BCl3 MFC with a full scale of 200 sccm (standard centimeter cube per minute). The 200 sccm BCl3 device has a nitrogen equivalent flow of 489 sccm. That is, a 200 sccm flow of BCl3 produces the same sensor output as a 489 sccm flow of nitrogen. The nonlinearity of the 200 sccm BCl3 device is shown in FIG. 1. This figure shows the error in the flow measurement as a function of flow if a constant gas correction factor is used relative to nitrogen gas. The error shown is the non-linearity of the gas correction factor.

For virtually all process gases, if the flow through the sensor is limited to less than 2 sccm (nitrogen equivalent), the nonlinearity is less than 5%. If the flow through the sensor is larger than 2 sccm, significant nonlinearities may exist. For the example shown in FIG. 1, the error of the sensor at a flow of 200 sccm is 3.9 sccm (nitrogen equivalent).

The origin of the non-linearity is the breakdown of the assumed relationship of the surrogate gas to the process gas. The point at which the non-linearity becomes significant is a function of two parameters: 1) the gas flow through the sensor; and 2) the gas properties (specifically the ratio of the thermal conductivity to the heat capacity). The non-linearity is due to the fact that the gas does not fully thermally develop within the MFC sensor. The elementary theory assumes that the flow is fully "thermally developed". The ability of the gas to be fully developed thermally is a function of the gas properties and the gas flow through the sensor. The flow through the sensor is adjustable, but the gas properties are fixed. If the flow through the sensor is constant, gases which will have large nonlinearities can be identified through examination of the gas properties. This evaluation has been accomplished for virtually all etch and chemical vapor deposition gases. Some of the gases which will exhibit this problem have been identified and are shown in Table 1.

TABLE 1

Gases with Large Nonlinearity

| Gas | K/Cp (ratio, in relative units) |
| --- | --- |
| WF6 | 1.97E−01 |
| HBr | 2.10E−01 |
| BCl3 | 2.26E−01 |
| Cl2 | 2.66E−01 |

The information in Table 1 has been confirmed experimentally. Gases with a low thermal conductivity to heat capacity ratio will have difficulty achieving fully developed thermal profiles. In Table 1 the most nonlinear gas will be WF6, followed by HBr. This is consistent with the experimental data.

Because some semiconductor processing gases exhibit large nonlinearities, attempts have been made to compensate for the nonlinearity with the electronics of the MFCs. In existing MFC designs, this has been accomplished through the use of a correction factor that is a function of the flow rate of the gas being used. The gas correction factor (relationship between calibration gas and the process gas) is typically given by a function such as $$CF=CF_o(1+aF+bF^2+cF^3)$$

where CFo is the flow independent gas correction factor (often termed the "Gas correction factor"), F is the flow of the gas, and a, b, and c are gas-specific empirical or theoretical coefficients. This type of equation is adaptable to different gases, as all of the terms can be gas specific. Additionally, a family of curves can be developed for different TMFC configurations so that this type of function can be adapted for different designs. The use of the flow-dependent gas correction factor has yielded typical process accuracies of +/−1%.

While 1% accuracies are typical when flow-dependent gas correction factors are used, the error in the accuracies of different MFCs vary as a result of their manufacturing tolerances, and the range of accuracies will form a generally bell-shaped distribution around the ideal. Thus, while 1% error may be typical, there will be many MFCs that have error exceeding 1%. Some of the devices will substantially exceed this typical error. To date, the industry has not been able to conquer this problem, and the attainable accuracy with process gases has been limited to greater than 1% of reading.

Referring to FIG. 2, a diagram illustrating the differences in measurements made by several MFCs of identical design is shown. Each of the curves represents the measurements made by a single MFC. The curves are different because the MFCs each have different physical parameters, all of which are within the manufacturing tolerances of the MFC design. It can be seen from the figure that most of the MFCs provide measurements that are very close to each other. One of the MFCs, however, deviates substantially from the others and produces much higher readings.

SUMMARY OF THE INVENTION

The ability to attain accuracies of better than 1% of reading with process gases is important for optimizing process capability of many industrial processes. The technology discussed in the previous section allows for models to be developed (either empirically or theoretically) to correlate the performance of flow meters with one fluid (e.g., the calibration fluid) to performance with another, different fluid (e.g., the process fluid). While this technique can compensate for basic differences in fluid properties and achieve better accuracies than more simple models (e.g. simple corrections for different heat capacities), it does not address one of the fundamental limitation faced by most flow instrumentation: how to adjust for device-to-device differences which are related to parts tolerancing or manufacturing processes in order to achieve the same performance in the "end products."

One or more of the problems outlined above may be solved by the various embodiments of the invention. Broadly speaking, the invention comprises systems and methods for correcting measurements of fluid flow using device-specific information to compensate for differences between individual devices of the same design. The prior art provides no means to compensate for device design and variations within the tolerances of the design. In fact, since prior art devices were typically analog, they did not even provide means to store device information or convert this information into correction factors to compensate for resulting measurement differences.

In one embodiment, a method for correcting fluid flow measurements between individual flow meters comprises providing device-specific calibration data, sensing a fluid flow, computing a measured fluid flow based on the sensed fluid flow, and correcting the measured fluid flow based on the device-specific calibration data. More particularly, the fluid flow measurement is corrected using several correction factors. One of the correction factors compensates for the use of a gas that is different from the calibration gas, one compensates for device variations in sensor sensitivity, and one compensates for variations in the split flow of fluid through the flow meter. The gas correction factor is dependent upon the rate of fluid flow and takes the form $CF_0(1+aF+bF^2+cF^3)$. The sensor correction factor takes the form $1+\alpha\Delta R$. The split flow correction factor takes the form $1-\beta\Delta ADC(Sp/100)^2$. The sensor and split flow correction factors may be used independently of each other in some embodiments.

In one embodiment, a system for making fluid flow measurements that are corrected for differences between individual flow meters comprises a fluid flow sensor, a memory configured to store device-specific calibration data, and control electronics coupled to the fluid flow sensor and the memory, wherein the control electronics are configured to compute a measured fluid flow based on a sensed fluid flow detected by the sensor and the device-specific calibration data. The calibration data defines correction factors for differences in calibration and process fluids, differences in sensor sensitivities between devices and differences in split flow ratios between devices. In one embodiment, the control electronics apply all three correction factors in the form $(CF_0(1+aF+bF^2+cF^3))$ $(1+\alpha\Delta R)$ $(1-\beta\Delta ADC(Sp/100)^2)$, where the first, and third terms corresponding to the gas, sensor and split flow correction factors, respectively.

Another embodiment of the invention comprises a software application. The software application is embodied in a computer-readable medium such as a floppy disk, hard disk drive, CD-ROM, DVD-ROM, RAM, ROM, DASD array, magnetic tape, optical storage device and the like. The computer readable medium contains instructions which are configured to cause a computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

Numerous additional embodiments are also possible.

The various embodiments of the invention may provide a number of advantages over the prior art. For example, one embodiment may establish the ability to have "unit or instrument serial number specific" corrections in the relationship between the calibration fluid and the process fluid. Further, one embodiment may provide the ability to compensate for serial number specific attributes and thereby allow the flow meter or controller to be more accurate with the actual process gas. Still further, having device or serial number specific corrections may allow the manufacturing tolerances to have a wider range of acceptable values which can lead to lower costs and better yield. Still further, the techniques disclosed herein may be applicable to a wide range of flow instrumentation from liquid flow meters of various sensing types to gas flow meters (both pressure based and thermal based).

BRIEF DESCRIPTION OF THE DRAWINGS

Other objects and advantages of the invention may become apparent upon reading the following detailed description and upon reference to the accompanying drawings.

Figure 1:
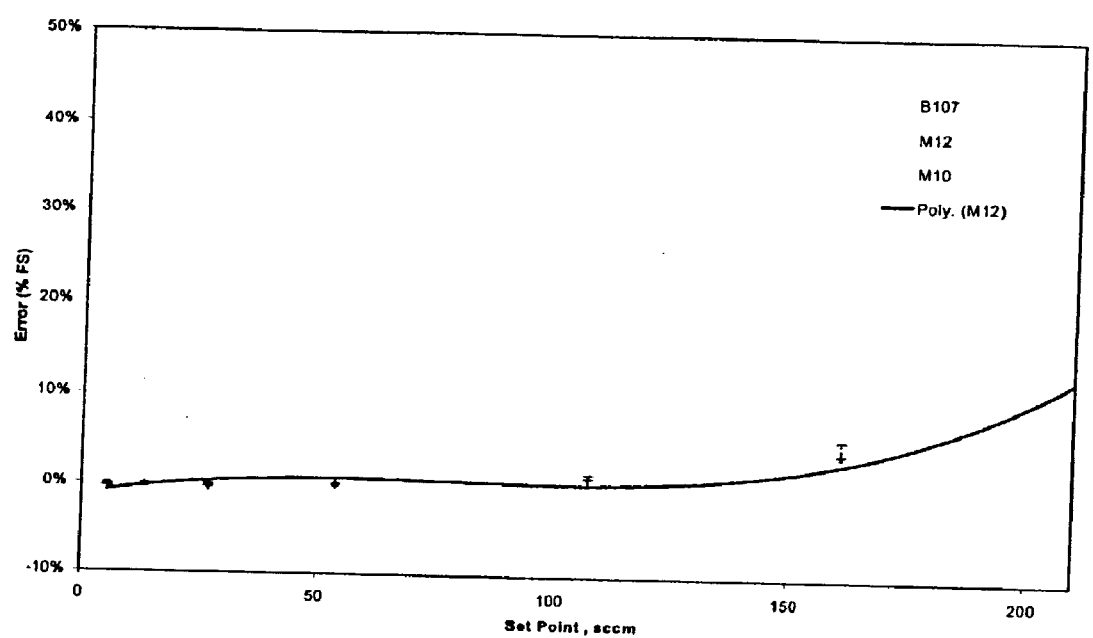
FIG. 1 is a diagram illustrating the error in the flow measurement as a function of flow if a constant gas correction factor is used relative to nitrogen gas.
Figure 2:
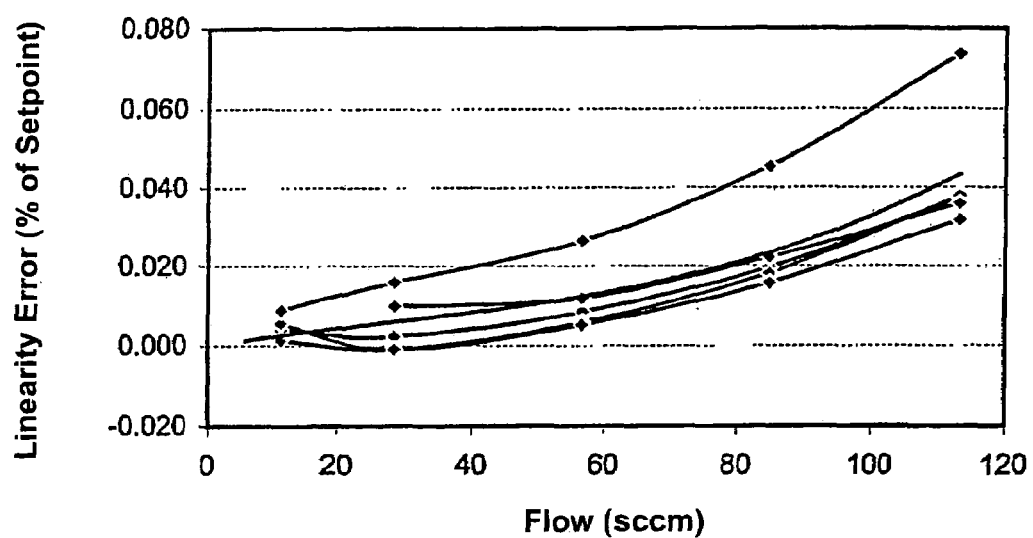
FIG. 2 is a diagram illustrating the differences in measurements made by several MFCs of identical design.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises systems and methods for improving the accuracy of mass flow controllers (MFCs) using device-specific information.

In one embodiment, a thermal MFC is calibrated with a first (calibration) gas for use with a second (process) gas. The flow of the process gas sensed by the MFC is corrected using a gas correction factor that accounts for the differences between the calibration gas and the process gas. The sensed flow is also corrected using one or more device-specific correction factors. One of the device-specific factors is based on the resistance of the flow sensor, and another of these factors is based on the split flow ratio of the MFC. Data corresponding to the correction factors is stored in a memory within the MFC and is used by the MFC electronics to adjust the flow measurement. The correction of the sensed flow using the device-specific correction factors provides a means for reducing variations in measurement between MFCs which arise from manufacturing differences between them.

Figure 3:
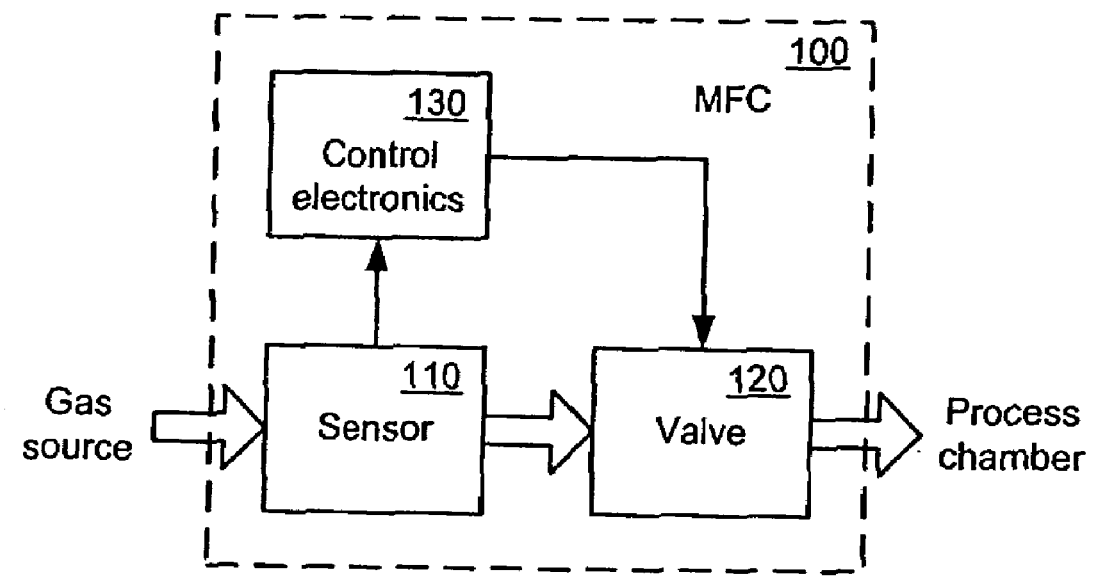
FIG. 3 is a block diagram illustrating the basic structure of an MFC in one embodiment.

Referring to FIG. 3, a block diagram illustrating the basic structure of an MFC in one embodiment is shown. MFC 100 is placed in the flow of a process gas from a gas source to a process chamber. The process gas flows from the gas source through a sensor 110, then through a valve 120, and then to the process chamber. Control electronics 130 are coupled to sensor 110 and valve 120. As the process gas flows through sensor 110, the rate of flow is sensed. A signal indicating the sensed flow is provided to the control electronics 130. Control electronics 130 process the received signal to determine a measured rate of flow. The measured rate of flow is then compared to a flow setpoint, which indicates the desired rate of flow of the process gas to the process chamber, and generates a control signal that is transmitted to valve 120. The control signal causes valve 120 to be adjusted to increase, decrease or maintain the current rate of flow, whichever is necessary to drive the measured flow to the flow setpoint.

One embodiment of the invention is implemented in a thermal MFC. The thermal MFC senses the flow of the process gas by diverting a portion of the gas to a sensor tube, then heating the gas and measuring the change in the temperature of the gas downstream. Generally speaking, the change in temperature is dependent upon the heat capacity of the gas (which is known) and the rate at which it flows through the sensor tube. The rate of flow of the gas through the sensor tube can therefore be calculated. Then, since the ratio of the flow through the sensor tube to the total flow is known, the total flow can be calculated.

As explained above with respect to FIG. 1, the calculation of the total flow is fairly straightforward at low flow rates because the gas correction factors for virtually all process gasses are linear. Consequently, a constant correction factor can be used to adjust the calculated total flow for the process gas when the MFC has been calibrated for a different calibration gas. In order to correct for the different gas at higher rates of flow, it is necessary to use a correction factor that is a function of flow rate. As indicated above, the correction factor that is typically used in this case has the form $$CF = CF_o(1 + aF + bF^2 + cF^3)$$

where $CF_o$ is the flow independent gas correction factor, F is the flow of the gas, and a, b, and c are gas-specific coefficients (which can be obtained either empirically or theoretically).

While the flow dependent gas correction factor provides a means to correct for different calibration and process gasses at both low and high flow rates, there are still sources of error that remain uncompensated. For example, as pointed out above, different MFCs of the same design (i.e., MFCs that are intended to be identical) may provide different measurements of a flow rate because of minute manufacturing differences. In a thermal MFC, these manufacturing differences generally come into play in two ways: differences in the resistances of the sensors can cause variations in the signals generated by the sensors (corresponding to the sensed flow) to vary; and variations in the ratios of flow through the sensor tube and total flow through the sensor can cause errors in the calculation of total flow. These sources of error are explained in more detail below.

Figure 4:
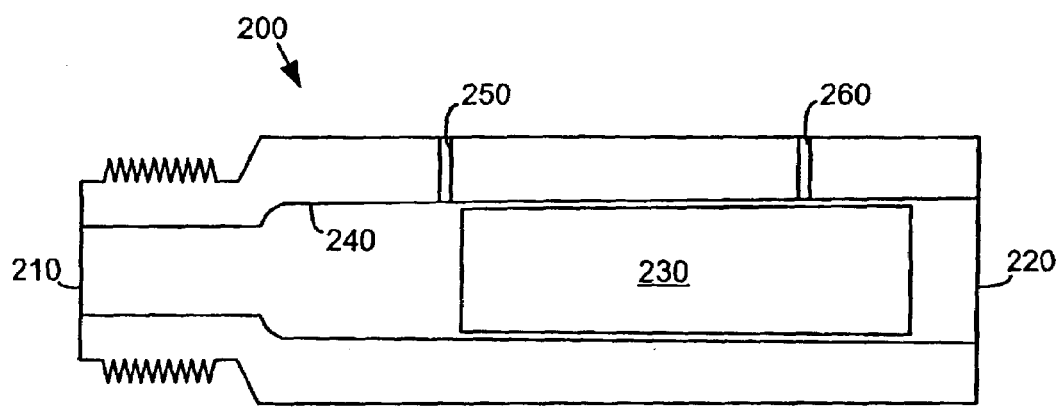
FIG. 4 is a diagram illustrating the structure of a laminar flow restrictor in accordance with one embodiment.

Referring to FIG. 4, a diagram illustrating the structure of a laminar flow restrictor in one embodiment is shown. Laminar flow restrictor 200 has an input port 210 through which gas enters the device, and an output port 220 through which the gas exits. Input port 210 is coupled to output port 220 by a conduit 240. A restrictor plug 230 is positioned in conduit 240 to restrict the flow of the gas through the conduit. Two apertures 250, 260 in the side of laminar flow restrictor 200 provide external access to conduit 240. The sensor tube (not shown in this figure) is coupled to these apertures to form an alternative flowpath parallel to conduit 240. Thus, a portion of the gas passing through laminar flow restrictor 200 flows through conduit 240 (or more specifically between the walls of conduit 240 and restrictor plug 230), while another portion of the gas flows through the sensor tube. The ratio of the flow through the sensor tube to the total flow is the split flow ratio.

In this particular design, restrictor plug 230 is adjustable. The walls of conduit 240 and the sides of restrictor plug 230 are slightly tapered. By moving restrictor plug 230 within conduit 240, the gap between the two can be changed, thereby changing the split ratio. (Pushing restrictor plug 230 further into conduit 240 from right to left decreases the gap and increases the split ratio, while moving it in the other direction increases the gap and decreases the split ratio.)

The fluid mechanics of the split ratio depends upon the gas properties (e.g., Reynolds numbers), as well as the exact geometry of the laminar flow restrictor. The clearances between the conduit walls and the restrictor plug which are necessary to achieve the flows of interest are often measured in the hundredths of an inch. In order to obtain the necessary reproduceability, tolerances on these clearances are a factor of 100 smaller (on the order of +/−0.00001 inches). These tolerances are not practical for the purpose of producing a cost effective product. As a result, the manufacturing tolerances can be higher than optimum, resulting in performance variations from one MFC to another (of identical design).

As noted above, prior art MFCs are limited in their achievable accuracy because of these physical variations within the manufacturing tolerances of the devices. This problem can be solved in embodiments of the present invention by developing device-specific gas correction factors to account for manufacturing variations. These correction factors are based on the physical characteristics of the individual MFCs, and may be determined either empirically or theoretically.

In one embodiment, the correction factors include the flow independent gas correction factor, a non-linearity correction factor and a sensor correction factor.

The non-linearity correction factor and the sensor correction factor compensate for device-specific characteristics. In other words, they compensate for manufacturing differences between different devices of the same design. All of these factors are multiplied to form a composite correction factor.

It should be noted that, while the embodiment described below employs both a non-linearity correction factor and a sensor correction factor, other embodiments may not include both of these correction factors. For example, if a particular design does not have significant variations in the sensor, it may not be necessary to use the sensor correction factor. It should also be noted that other embodiments may use correction factors having somewhat different forms than the specific forms shown below. Still further, in embodiments which operate in a different manner (e.g., non-thermal MFCs), the correction factors for manufacturing differences may take entirely different forms. In the case of a non-thermal MFC, for instance, a sensor correction factor most likely would not include a resistance term, but would instead include a term dependent upon a different parameter. All of these alternative embodiments are within the scope of this disclosure.

In one embodiment, the correction factor for the variations in the laminar flow restrictor is based on the fact that the split flow ratio is not constant, and is instead non-linear with flow and gas dependent. In this instance, the correction factor for laminar flow restrictor variations, which compensates for the MFC flow split ratio and flow dependence of the flow split ratio, is $$1-\beta \Delta ADC(Sp/100)^2$$

where $\beta$ is a gas specific, device independent coefficient, $\Delta ADC$ is the non-linearity of the device with respect to the calibration flow in percent of the maximum allowable for the particular MFC. The $\beta$ coefficient can be determined either empirically or theoretically. It is gas specific, but device independent. The $\Delta ADC$ term is determined from the surrogate gas calibration and may be different for every MFC. ADC for an MFC is the ratio of the sensor output at two predetermined percentages of maximum flow. For instance, the sensor output may be measured at 50% and 100% of maximum flow. The same percentages are used for each MFC. $\Delta ADC$ is the difference between the ADC for the particular MFC and the average ADC for MFCs of the same design.

Figure 5:
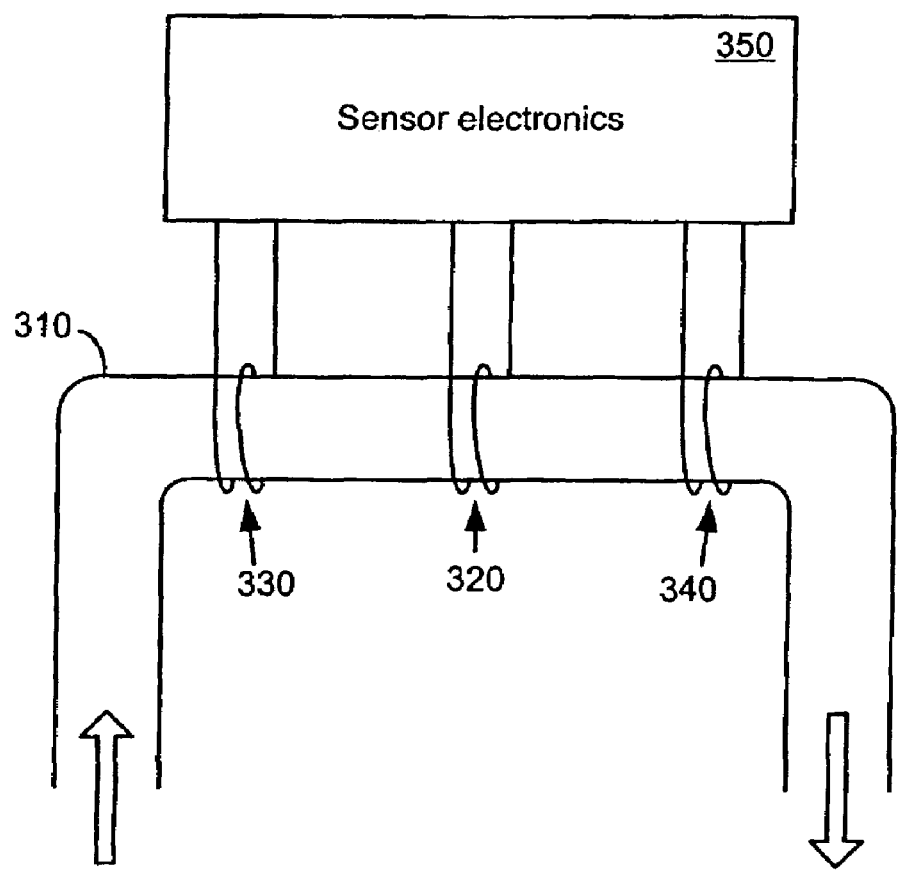
FIG. 5 is a diagram illustrating the sensor portion of a thermal MFC in one embodiment.

Referring to FIG. 5, a diagram illustrating the sensor portion of a thermal MFC in one embodiment is shown. Sensor 300 has a sensor tube 310 which is coupled to the laminar flow restrictor as previously described. Because there is a pressure drop between the apertures connecting sensor tube 310 to the laminar flow restrictor, the gas is drawn through the sensor tube. As the gas passes heating element 320, the gas is heated. The amount by which it is heated depends upon not only the heat capacity and flow rate of the gas, but also on the heat generated by heating element 320 (which is dependent upon the resistance, R, of the heating element). The temperature of the gas before it passes heating element 320 is measured by temperature sensor 330, while the temperature of the gas after it passes heating element 320 is measured by temperature sensor 340. The temperature difference between the two temperature sensors can then be used to calculate the rate of flow of gas through sensor tube 310.

Although the resistance, R, of heating element 320 is intended to be identical for each MFC of a particular design, there is normally some variation due to manufacturing tolerances. A correction factor can therefore be developed to correct for differences in the resistance of the sensors of different devices. In this instance, the following correction factor is used:

$$1+\alpha \Delta R$$

where $\Delta R$ is the difference between the resistance of the particular MFC and the average resistance of all MFCs of the same design (which, in practice is determined by averaging the resistances of a sampling of MFCs). Either the resistance itself or $\Delta R$ can be stored and/or read from the MFC diagnostics.

The $\alpha$ term is a gas specific value which can be determined either empirically or theoretically. For example, the value of $\alpha$ can be determined by performing a least-squares fit of the empirical data (ignoring the split-flow linearity correction factor). The $\alpha$ term can also be determined theoretically. The heat capacity (Cp) of the gas as a function of temperature is linear, so $Cp=Cp_o(1+\alpha_1 \Delta T)$, where $Cp_o$ is the heat capacity at a reference temperature, and $\alpha_1$ is the temperature dependence of the heat capacity, which can simply be looked up for the gas. The $Cf_o$ term above is just the heat capacity of the reference gas (Nitrogen) divided by the heat capacity of the process gas ($CP_{o(reference)}/CP_{o(process)}$). Thus, $\alpha=(1+\alpha_1\Delta T)/(1+\alpha_2\Delta T)$. If Nitrogen is the reference gas, its temperature dependence is zero, and, effectively, $\alpha=1/\alpha_2$ (=1/temperature constant of the process gas' heat capacity).

Figure 6:
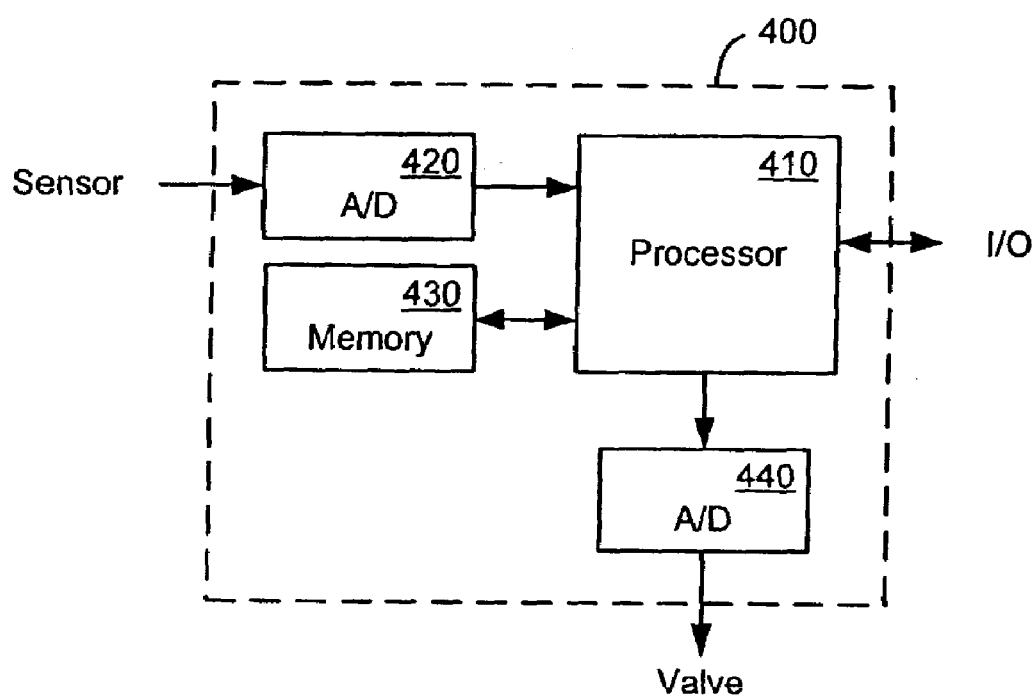
FIG. 6 is a functional block diagram illustrating the basic structure of the MFC electronics in one embodiment.

The calculation of the measured flow and the adjustment of this value using the correction factors is performed by the control electronics of the MFC. Referring to FIG. 6, a functional block diagram illustrating the basic structure of the MFC electronics in one embodiment is shown. As depicted in the figure, control electronics 400 are built around a data processor 410. In this embodiment, analog signals from the sensor are processed by analog-to-digital converter 420, which passes a digitized sensor signal to processor 410. Processor 410 is coupled to a memory 430 which stores the data for the various correction factors. Processor 410 retrieves this data from memory 430 and uses it, as well as the digitized sensor signal, to compute a measured flow rate. Processor 410 then compares the measured flow rate to a setpoint and generates a signal which indicates the relationship of the measured flow rate to the setpoint. This signal is conveyed to valve drive circuitry 440, which in turn generates corresponding analog signals to drive the valve that controls the flow of the process gas.

As indicated above, one embodiment employs all three of the correction factors discussed above (the gas correction factor, the sensor correction factor and the split flow or linearity correction factor). Thus, the measured flow for a process gas is computed as the calibration gas flow (corresponding to the sensed flow) times the overall correction factor CF, which is the product of the three individual correction factors:

$$CF = CF_o(1 + aF + bF^2 + cF^3)(1 + \alpha \Delta R)(1 - \beta \Delta ADC(Sp/100)^2)$$

Figure 7:
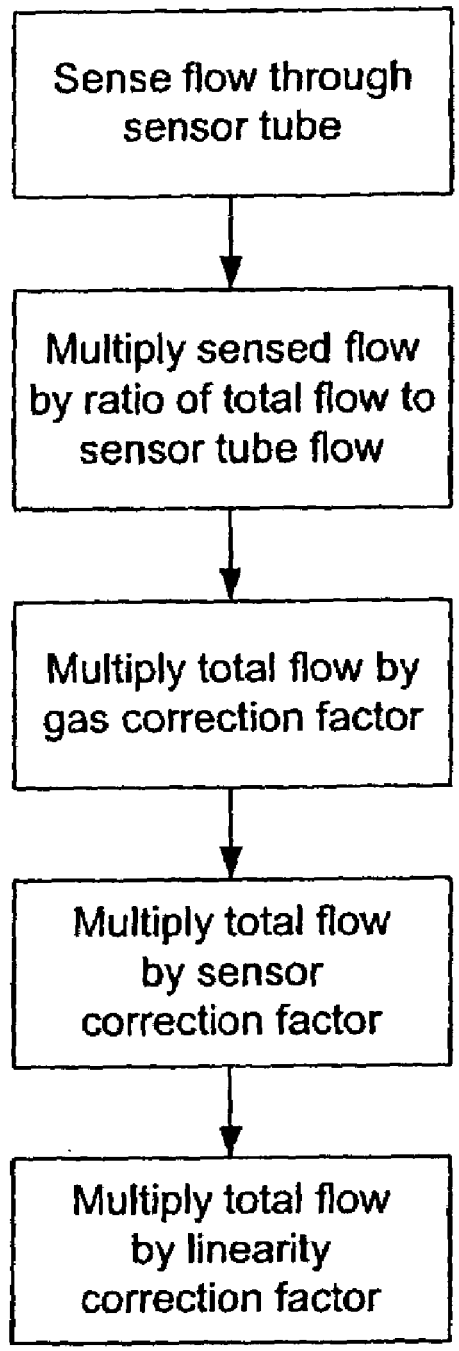
FIG. 7 is a flow diagram illustrating a simple method according to which an MFC operates in one embodiment.

The operation of the MFC can be shown as a simple method, as illustrated by the flow diagram shown in FIG. 7. As depicted in the figure, the rate of flow of the process gas through the sensor tube is first sensed, then this flow is multiplied by the ratio of the total process gas flow to the sensed gas flow, then the result is multiplied by the gas correction factor, the sensor correction factor, and the linearity correction factor.

It should be noted that other embodiments of the invention may employ only one of the two device-dependent correction factors (the sensor correction factor and the linearity correction factor). This will typically be in addition to the gas correction factor used in many current devices. These other embodiments may also use different forms for the sensor correction factor and/or the linearity correction factor.

The data for the correction factors can be stored in memory 430 in a variety of forms, depending upon the particular implementation. The device-dependent components of the correction factors may be determined and stored in the memory for later computation of the correction factors, or the correction factors may be computed (in whole or in part, depending upon the form used) and stored themselves for later use. Processor 410 can then access the data as necessary for measurement corrections.

It should be noted that, while the foregoing description focuses on the application of the invention in a thermal MFC, it may be implemented in other types of flow meters in other embodiments. It should also be noted that the methodologies disclosed herein may be implemented in various combinations of software (including firmware) and hardware. The present application is therefore intended to cover software applications that include instructions for causing a data processor to perform the methods disclosed herein. These software applications may be embodied in any medium readable by such a data processor, including RAM, ROM, floppy disks, CD-ROMs, DVD-ROMs, and the like. Likewise, a data processor which is configured to execute such software applications, or which is otherwise programmed to perform the methods disclosed herein is intended to be covered by the present application.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method comprising:
   providing device-specific calibration data;
   sensing a fluid flow;
   computing a measured fluid flow based on the sensed fluid flow; and
   correcting the measured fluid flow based on the device-specific calibration data, wherein correcting the measured fluid flow based on the device-specific calibration data comprises adjusting the measured fluid flow using a device-specific sensor correction factor, wherein the device-specific sensor correction factor is a function of a sensor resistance and has the form $(1+\alpha\Delta R)$, where $\Delta R$ is a difference between the device-specific sensor resistance and an average of a sensor resistance of several devices of a same design and $\alpha$ is a constant which is determined either empirically or theoretically.

2. A method comprising:
   providing device-specific calibration data;
   sensing a fluid flow
   computing a measured fluid flow based on the sensed fluid flow; and correcting the measured fluid flow based on the device-specific calibration data, wherein correcting the measured fluid flow based on the device-specific calibration data comprises adjusting the measured fluid flow using a device-specific linearity correction factor wherein the device-specific linearity correction factor is a function of a sensor split flow ratio.

3. The method of claim 2, wherein the device-specific linearity correction factor has the form $(1-\beta\Delta ADC(Sp/100)^2)$, where $\alpha ADC$ is a difference between the device-specific split flow ratio non-linearity and an average of a split flow ratio non-linearity of several devices of a same design, Sp is the sensed fluid flow expressed as a percent of maximum allowable flow, and $\beta$ is a constant which is determined either empirically or theoretically.

4. A method comprising:
   providing device-specific calibration data;
   sensing a fluid flow;
   computing a measured fluid flow based on the sensed fluid flow; and correcting the measured fluid flow based on the device-specific calibration data, wherein correcting the measured fluid flow based on the device-specific calibration data comprises adjusting the measured fluid flow using a device-specific sensor correction factor and a device-specific linearity correction factor, wherein the device-specific sensor correction factor is a function of a sensor resistance and the device-specific linearity correction factor is a function of a sensor split flow ratio.

5. The method of claim 4, wherein the device-specific sensor correction factor has the form $(1+\alpha\Delta R)$, where $\Delta R$ is a difference between the device-specific sensor resistance and an average of a sensor resistance of several devices of a same design, and wherein the device-specific linearity correction factor has the form $(1-\beta\Delta ADC(Sp/100)^2)$, where $\Delta ADC$ is a difference between the device-specific split flow ratio non-linearity and an average of a split flow ratio non-linearity of the several devices of the same design, Sp is the sensed fluid flow expressed as a percent of maximum allowable flow, and $\alpha$ and $\beta$ are constants which are determined either empirically or theoretically.

6. A system comprising:
a fluid flow sensor;
a memory configured to store device-specific calibration data; and
control electronics coupled to the fluid flow sensor and the memory, wherein the control electronics are configured to compute a measured fluid flow based on a sensed fluid flow detected by the sensor and the device-specific calibration data and wherein the control electronics are configured to correct the measured fluid flow using a device-specific sensor correction factor, and wherein the device-specific sensor correction factor is a function of a sensor resistance and the device-specific sensor correction factor has the form $(1+\alpha\Delta R)$, where $\Delta R$ is a difference between the device-specific sensor resistance and an average of a sensor resistance of several devices of a same design, and $\alpha$ is a constant which is determined either empirically or theoretically.

7. A system comprising:
a fluid flow sensor;
a memory configured to store device-specific calibration data; and
control electronics coupled to the fluid flow sensor and the memory, wherein the control electronics are configured to compute a measured fluid flow based on a sensed fluid flow detected by the sensor and the device-specific calibration data and wherein the control electronics are configured to correct the measured fluid flow using a device-specific linearity correction factor wherein the device-specific linearity correction factor is a function of a sensor split flow ratio.

8. The system of claim 7, wherein the device-specific linearity correction factor has the form $(1-\beta\Delta ADC(Sp/100)^2)$, where $\Delta ADC$ is a difference between the device-specific split flow ratio non-linearity and an average of a split flow ratio non-linearity of several devices of a same design, Sp is the sensed fluid flow expressed as a percent of maximum allowable flow, and $\beta$ is a constant which is determined either empirically or theoretically.

9. A system comprising:
a fluid flow sensor;
a memory configured to store device-specific calibration data; and
control electronics coupled to the fluid flow sensor and the memory, wherein the control electronics are configured to compute a measured fluid flow based on a sensed fluid flow detected by the sensor and the device-specific calibration data and wherein the control electronics are configured to correct the measured fluid flow using a device-specific sensor correction factor and a device-specific linearity correction factor, wherein the device-specific sensor correction factor is a function of a sensor resistance and the device-specific linearity correction factor is a function of a sensor split flow ratio.

10. The system of claim 9, wherein the device-specific sensor correction factor has the form $(1+\alpha\Delta R)$, where $\Delta R$ is a difference between the device-specific sensor resistance and an average of a sensor resistance of several devices of a same design, and wherein the device-specific linearity correction factor has the form $(1-\beta\Delta ADC(Sp/100)^2)$, where $\Delta ADC$ is a difference between the device-specific split flow ratio non-linearity and an average of a split flow ratio non-linearity of the several devices of the same design, Sp is the sensed fluid flow expressed as a percent of maximum allowable flow, and $\alpha$ and $\beta$ are constants which are determined either empirically or theoretically.

* * * * *

UNITED STATES PATENT AND TRADEMARK OFFICE
CERTIFICATE OF CORRECTION

PATENT NO. : 7,243,035 B2 Page 1 of 1
APPLICATION NO. : 10/444249
DATED : July 10, 2007
INVENTOR(S) : Stuart A. Tison et al.

It is certified that error appears in the above-identified patent and that said Letters Patent is hereby corrected as shown below:

Column 10, line 57, delete "$\alpha ADC$" and replace with --$\Delta ADC$--.

Signed and Sealed this

Eleventh Day of September, 2007

JON W. DUDAS
*Director of the United States Patent and Trademark Office*